United States Patent
Adams et al.

(10) Patent No.: US 9,392,018 B2
(45) Date of Patent: Jul. 12, 2016

(54) LIMITING THE EFFICACY OF A DENIAL OF SERVICE ATTACK BY INCREASING CLIENT RESOURCE DEMANDS

(71) Applicant: Juniper Networks, Inc., Sunnyvale, CA (US)

(72) Inventors: Kyle Adams, Brisbane, CA (US); Daniel J. Quinlan, San Francisco, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 173 days.

(21) Appl. No.: 14/042,221

(22) Filed: Sep. 30, 2013

(65) Prior Publication Data

US 2015/0096020 A1  Apr. 2, 2015

(51) Int. Cl.
*G06F 15/173* (2006.01)
*G06F 11/00* (2006.01)
*G06F 12/14* (2006.01)
*G06F 12/16* (2006.01)
*H04L 29/06* (2006.01)

(52) U.S. Cl.
CPC ........ *H04L 63/1458* (2013.01); *H04L 63/1425* (2013.01); *H04L 63/1441* (2013.01)

(58) Field of Classification Search
CPC ............ H04L 63/1458; H04L 63/1441; H04L 63/1408; H04L 2463/141; H04L 9/3271; G06F 21/55
USPC ........ 726/2, 3, 4, 22, 23, 26, 27, 28; 709/225, 709/226, 227, 228, 229
See application file for complete search history.

(56) References Cited

U.S. PATENT DOCUMENTS

| | | | |
|---|---|---|---|
| 6,851,060 B1* | 2/2005 | Shrader | 726/10 |
| 7,197,639 B1* | 3/2007 | Juels et al. | 713/168 |
| 7,233,997 B1* | 6/2007 | Leveridge et al. | 709/229 |
| 7,600,255 B1* | 10/2009 | Baugher | 726/22 |
| 7,617,524 B2* | 11/2009 | Haverinen et al. | 726/6 |
| 7,627,906 B2* | 12/2009 | Nakagawa et al. | 726/29 |
| 7,694,335 B1* | 4/2010 | Turner et al. | 726/14 |
| 8,001,188 B2* | 8/2011 | Miyake et al. | 709/205 |
| 8,171,562 B2* | 5/2012 | Feng | 726/27 |
| 8,220,042 B2* | 7/2012 | Hagiu et al. | 726/14 |
| 8,321,955 B2* | 11/2012 | Feng et al. | 726/27 |
| 2005/0050364 A1* | 3/2005 | Feng | 713/201 |
| 2006/0069804 A1* | 3/2006 | Miyake | H04L 63/1458 709/237 |

(Continued)

OTHER PUBLICATIONS

Wikipedia, "Botnet", http://en.wikipedia.org/wiki/Botnet, Sep. 2, 2013, 9 pages.

(Continued)

*Primary Examiner* — Tae Kim
(74) *Attorney, Agent, or Firm* — Harrity & Harrity, LLP

(57) ABSTRACT

A device may detect an attack. The device may receive, from a client device, a request for a resource. The device may determine, based on detecting the attack, a computationally expensive problem to be provided to the client device, where the computationally expensive problem requires a computation by the client device to solve the computationally expensive problem. The device may instruct the client device to provide a solution to the computationally expensive problem. The device may receive, from the client device, the solution to the computationally expensive problem. The device may selectively provide the client device with access to the resource based on the solution.

20 Claims, 9 Drawing Sheets

(56) References Cited

U.S. PATENT DOCUMENTS

2006/0282880 A1* 12/2006 Haverinen et al. ............... 726/3
2007/0061878 A1* 3/2007 Hagiu et al. ................... 726/14
2007/0157300 A1* 7/2007 Sivaradjane et al. ............ 726/9
2010/0031315 A1* 2/2010 Feng et al. ...................... 726/3

OTHER PUBLICATIONS

Wikipedia, "Denial-of-service attack", http://en.wikipedia.org/wiki/Denial-of-service_attack, Sep. 17, 2013, 14 pages.

European Search Report corresponding to EP 14 18 6805 mailed Feb. 9, 2015, 5 pages.

Fung et al., "A Denial-of-Service Resistant Public-key Authentication and Key Establishment Protocol," 21$^{st}$ IEEE International Performance, Computing, and Communications Conference, 2002, pp. 171-178.

Juels et al., "Client Puzzles: A Cryptographic Countermeasure Against Connection Depletion Attacks," Proceedings of the Network and Distributed System Security Symposium, NDSS, 1999, 15 pages.

* cited by examiner

US 9,392,018 B2

LIMITING THE EFFICACY OF A DENIAL OF SERVICE ATTACK BY INCREASING CLIENT RESOURCE DEMANDS

BACKGROUND

A denial-of-service (DoS) attack is an attempt to make a target device, such as a server, a router, or other network resource, unavailable to the intended users of the target device. A distributed denial-of-service (DDoS) attack is a DoS attack that uses more than once source device and/or location to attack the target device. One common method of attack involves saturating a target device with many external communications requests, such that the target device cannot respond to legitimate traffic, or responds so slowly as to be rendered essentially unavailable. A DDoS attack may be achieved using a botnet, where an attacker uses malicious code to infect a large number of computing devices, and instructs the computing devices to send communication requests to the target device.

SUMMARY

According to some possible implementations, a device may include one or more processors configured to: detect a denial-of-service attack; receive a request, for access to a resource, from a client device; determine, based on the request and further based on detecting the denial-of-service attack, a computationally expensive problem to be provided to the client device; provide the computationally expensive problem to the client device, where the computationally expensive problem is provided to cause the client device to solve the computationally expensive problem; receive, from the client device, a solution to the computationally expensive problem; and grant or deny the client device access to the resource based on the solution.

According to some possible implementations, a computer-readable medium may store one or more instructions that, when executed by one or more processors, cause the one or more processors to: detect an attack; receive, from a client device, a request for a resource; determine, based on detecting the attack, a computationally expensive problem to be provided to the client device, where the computationally expensive problem requires a computation by the client device to solve the computationally expensive problem; instruct the client device to provide a solution to the computationally expensive problem; receive, from the client device, the solution to the computationally expensive problem; and selectively provide the client device with access to the resource based on the solution.

According to some possible implementations, a method may include: detecting, by a security device, a denial-of-service attack; receiving, by the security device and from a client device, a request; determining, by the security device and based on detecting the denial-of-service attack, a computationally expensive problem to be provided to the client device; determining, by the security device, code that causes the client device to solve the computationally expensive problem; instructing, by the security device, the client device to execute the code, where the code causes the client device to generate a solution to the computationally expensive problem; receiving, by the security device and from the client device, the solution; and providing, by the security device and to the client device, a response to the request based on the solution.

DETAILED DESCRIPTION

The following detailed description of example implementations refers to the accompanying drawings. The same reference numbers in different drawings may identify the same or similar elements.

An attacker, such as a hacker, may use a denial-of-service (DoS) attack, such as a distributed denial-of-service (DDoS) attack (e.g., a DoS attack from more than one client device), to attempt to make a network device unavailable to intended users of the network device, or to reduce the availability of the network device to respond to requests from users. For example, the attacker may use a botnet to cause a large number of client devices to send requests to the network device. The network device may be overwhelmed by the large number of requests, which may reduce the ability of the network device to respond to legitimate requests. DoS attacks that utilize a botnet may be computationally inexpensive for a client device as compared to the network device. For example, a client device may require less memory and/or processing power to generate and transmit a request than the amount of memory and/or processing power required for the network device to respond to the request. Implementations described herein may reduce the efficacy of a DoS attack by increasing the computational expense for a client device to send a request to a network device.

Figure 1:
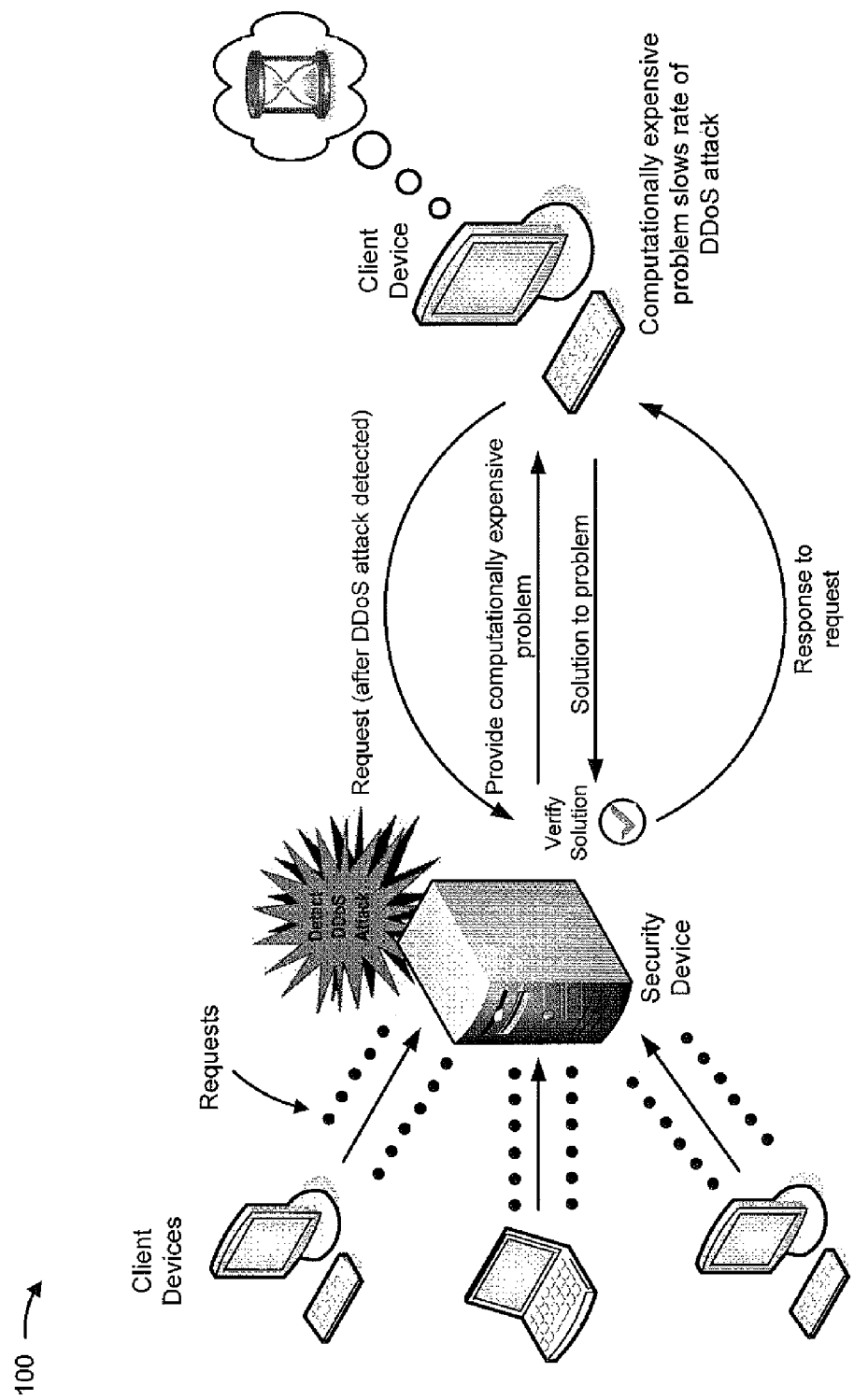
FIG. 1 is a diagram of an overview of an example implementation described herein.

FIG. 1 is a diagram of an overview of an example implementation 100 described herein. As shown in FIG. 1, a security device, acting as an intermediary between client devices and a network device that is the target of a DoS attack, may receive a large quantity of requests from the client devices. The security device may detect that the network device is the subject of a DoS attack, such as by detecting that a quantity of received requests satisfies a threshold (e.g., more than 100,000 requests per second). As further shown in FIG. 1, after the security device determines that the network device is the subject of a DoS attack, the security device may receive an additional request from a client device (e.g., intended for the network device). The security device may provide a computationally expensive problem (e.g., using code, such as HTML code, JavaScript, etc.) to the client device based on receiving the request.

The computationally expensive problem may include a problem that requires the client device to utilize a large amount of memory and/or processing power to solve. Once the client device has solved the computationally expensive problem, the client device may provide the solution to the security device. The security device may determine whether the solution is correct. If the solution is correct, the security device may provide the client device with access to the network device and/or a resource requested in the request from the client device. If the solution is not correct, the security device may provide another computationally expensive problem, which may be made more difficult than the previously provided computationally expensive problem. In this way, the security device may slow the rate of the DoS attack by requiring client devices to consume a large quantity of computing resources before sending an additional request to the network device during the DoS attack.

Figure 2:
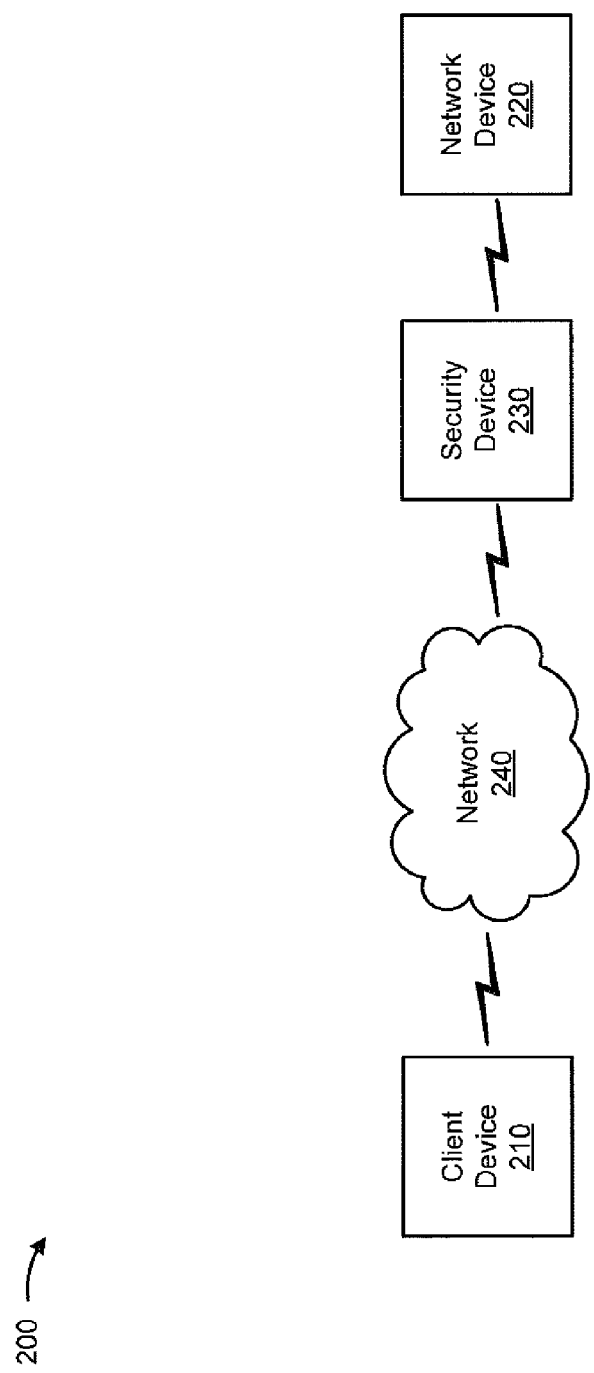
FIG. 2 is a diagram of an example environment in which systems and/or methods described herein may be implemented.

FIG. 2 is a diagram of an example environment in which systems and/or methods described herein may be implemented. As shown in FIG. 2, environment 200 may include a client device 210, a network device 220, a security device 230, and a network 240. Devices of environment 200 may interconnect via wired connections, wireless connections, or a combination of wired and wireless connections.

Client device 210 may include one or more devices capable of receiving and/or providing information over a network (e.g., network 240), and/or capable of generating, storing, and/or processing information received and/or provided over the network. For example, client device 210 may include a computing device, such as a laptop computer, a tablet computer, a handheld computer, a desktop computer, a mobile phone (e.g., a smart phone, a radiotelephone, etc.), a personal digital assistant, a server, or a similar device. Client device 210 may receive information from and/or provide information to network device 220 (e.g., via network 240 and/or security device 230). In some implementations, client device 210 may include a browser used to interact with network device 220, such as by sending requests (e.g., HTTP requests) to network device 220 and/or receiving responses (e.g., HTTP responses) from network device 220. In some implementations, requests from client device 210 may be processed by security device 230 before being sent to network device 220. In some implementations, client device 210 may be part of a botnet, which may be used to perform a DoS attack on network device 220.

Network device 220 may include one or more devices capable of receiving and/or providing information over a network (e.g., network 240), and/or capable of generating, storing, and/or processing information received and/or provided over the network. For example, network device 220 may include a server (e.g., an application server, a proxy server, a web server, a host server, etc.), a traffic transfer device (e.g., a router, a hub, a bridge, a switch, etc.), or the like. Network device 220 may receive information from and/or provide information to client device 210 (e.g., via network 240 and/or security device 230). Network device 220 may respond to requests (e.g., requests for resources) received from client device 210. In some implementations, responses from network device 220 may be processed by security device 230 before being sent to client device 210.

Security device 230 may include one or more devices capable of processing and/or transferring traffic between client device 210 and network device 220. For example, security device 230 may include a network device, such as a reverse proxy, a server (e.g., a proxy server), a traffic transfer device, a gateway, a firewall, a router, a bridge, a hub, a switch, a load balancer, an intrusion detection device, or the like. In some implementations, security device 230 may act as a gateway to network device 220 or a collection of network devices 220 associated with, for example, a private network and/or a data center. Security device 230 may protect network device 220 from client devices 210 by detecting a DoS attack from client devices 210. For example, responses sent from security device 230 to client device 210 may cause client device 210 to perform a computation (e.g., to solve a computationally expensive problem) before client device 210 can send a request to network device 220.

Network 240 may include one or more wired and/or wireless networks. For example, network 240 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
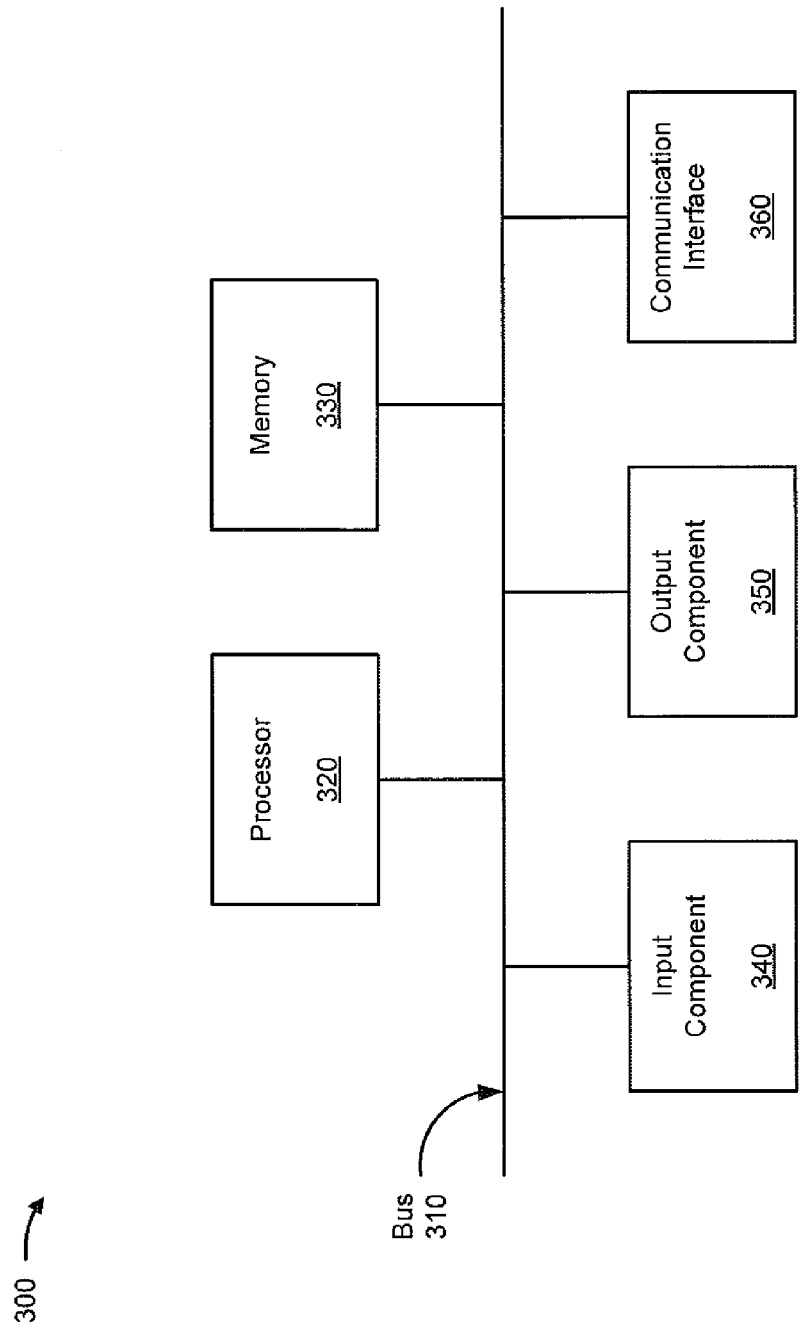
FIG. 3 is a diagram of example components of one or more devices of FIG. 2.

FIG. 3 is a diagram of example components of a device 300, which may correspond to client device 210, network device 220, and/or security device 230. In some implementations, client device 210, network device 220, and/or security device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
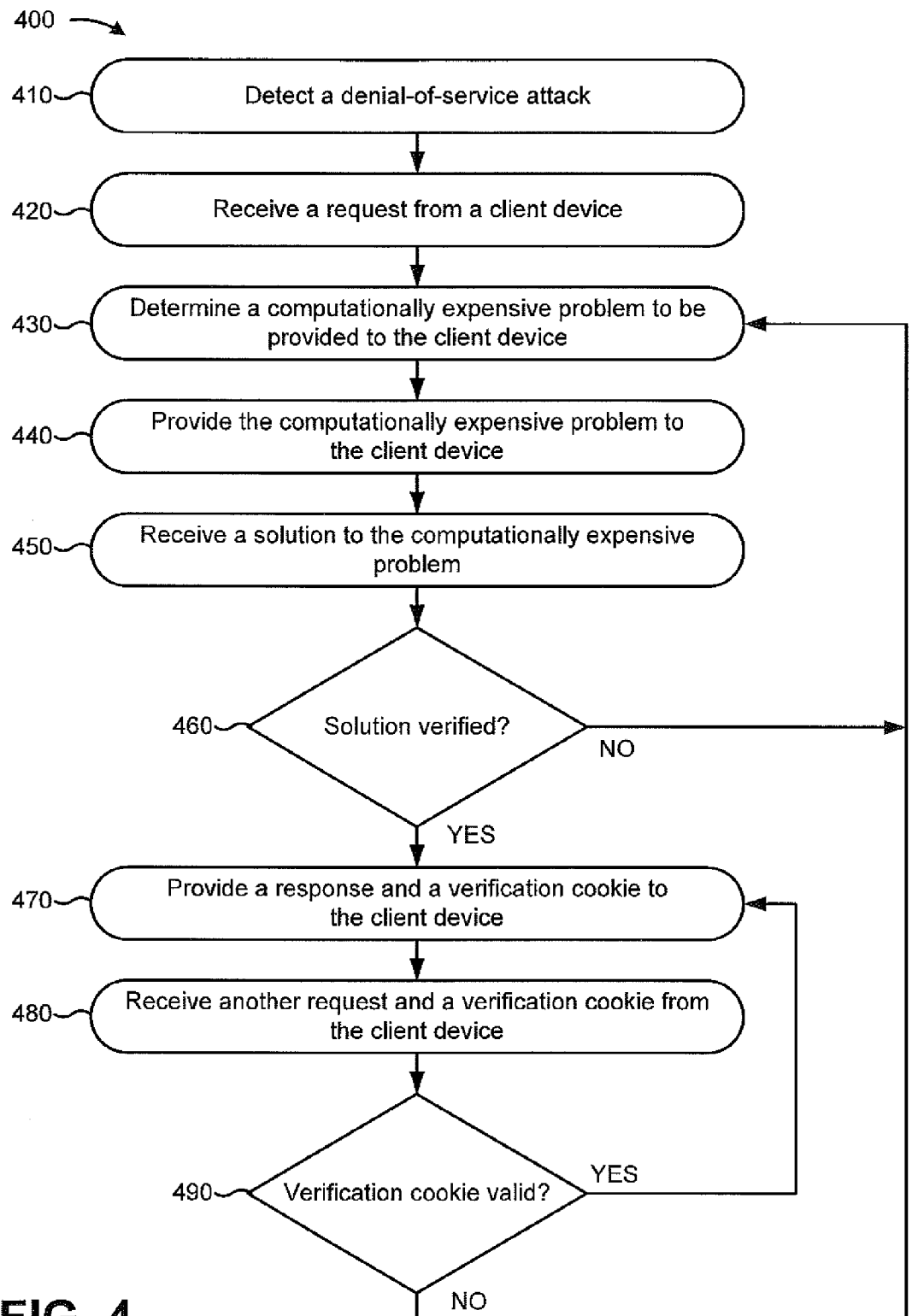
FIG. 4 is a flow chart of an example process for limiting the efficacy of a DoS attack by increasing client resource demands.

FIG. 4 is a flow chart of an example process 400 for limiting the efficacy of a DoS attack by increasing client resource demands. In some implementations, one or more process blocks of FIG. 4 may be performed by security device 230. In some implementations, one or more process blocks of FIG. 4 may be performed by another device or a group of devices separate from or including security device 230, such as client device 210 and/or network device 220.

As shown in FIG. 4, process 400 may include detecting a denial-of-service attack (block 410). For example, security device 230 may detect a denial-of-service (DoS) attack, such as a distributed denial-of-service attack (DDoS). Security device 230 may detect the DoS attack based on a DoS metric (e.g., a traffic measurement, a response time measurement, a latency measurement, etc.), in some implementations. For example, security device 230 may determine that a quantity of requests received in a particular period of time satisfies a threshold (e.g., more than 100,000 requests per second). As another example, security device 230 may determine that an amount of time between receiving a request and responding to the request satisfies a threshold (e.g., greater than 500 milliseconds for network device 220 to respond to a request), that an average amount of time for responding to requests satisfies a threshold, etc. As another example, security device 230 may determine that incoming traffic is suspicious (e.g., based on a type of request, a quantity of requests, a quantity of the same type of requests, metadata associated with the requests, based on the traffic and/or client device 210 matching an attack signature, based on a client device 210 being identified on a blacklist, etc.). The above techniques are provided as an example, and security device 230 may use other techniques and/or a combination of techniques to detect a DoS attack.

As further shown in FIG. 4, process 400 may include receiving a request from a client device (block 420). For example, security device 230 may receive a request after detecting the DoS attack, and/or may receive a suspicious request. The request may include a request for network device 220 to perform some processing and/or to provide a response to the request, and the request may be intercepted by security device 230. For example, the request may include a request for a resource, may include a request for access to network device 220, may include a request for a resource accessible by network device 210, may include an HTTP request, a file transfer protocol (FTP) request, a transmission control protocol (TCP) request, etc. Security device 230 may receive the request from client device 210. The request may be a legitimate request (e.g., a request from an intended user associated with network device 220) or may be a suspicious request (e.g., a request intended to slow network device 220 and/or make network device 220 unavailable as part of a DoS attack).

As further shown in FIG. 4, process 400 may include determining a computationally expensive problem to be provided to the client device (block 430). For example, security device 230 may determine a computationally expensive problem to be provided to client device 210. In some implementations, the computationally expensive problem may be provided using code (e.g., computer code, Hypertext Markup Language (HTML) code, a script, etc.) that includes the computationally expensive problem (e.g., code that causes client device 210 to perform the computationally expensive problem). A computationally expensive problem may include a problem that requires a large amount of computing resources (e.g., an amount of processing power, memory, etc. that satisfies a threshold) to solve the problem.

In some implementations, security device 230 may determine whether to provide the computationally expensive problem (e.g., whether to provide a response to the request that includes the computationally expensive problem or whether to provide a response to the request that does not include a computationally expensive problem). For example, security device 230 may provide a computationally expensive problem to a particular percentage of requests, to a particular percentage of client devices 210, etc. In some implementations, the determination and/or the percentage may be based on a DoS metric (e.g., a quantity of requests received in a particular time period, a response time, etc.). For example, security device 230 may provide a computationally expensive problem as a response to a first percentage of requests when the DoS metric satisfies a first threshold, may provide a computationally expensive problem as a response to a second percentage of requests when the DoS metric satisfies a second threshold, etc.

Security device 230 may determine whether to provide a computationally expensive problem based on a type of request, in some implementations. For example, security device 230 may categorize requests, such as by categorizing requests as suspicious or legitimate. Security device 230 may provide a response without a computationally expensive problem to a client device 210 that sends a legitimate request, and may provide a response that includes a computationally expensive problem to a client device 210 that sends a suspicious request.

Security device 230 may determine a type of computationally expensive problem to be provided to client device 210, in some implementations. A type of computationally expensive problem may include, for example, a memory-intensive problem (e.g., that requires client device 210 to store a large amount of information in memory), a processing-intensive problem (e.g., that requires client device 210 to use a large amount of processing power to solve the problem), a problem that requires user input (e.g., a CAPTCHA problem), a problem that does not require user input, a hash criterion problem (described elsewhere herein), a hash list problem (described elsewhere herein), and/or a combination of these or other types of problems.

Security device 230 may determine the type of computationally expensive problem to be provided to client device 210 based on, for example, a DoS metric (e.g., a DoS metric associated with security device 230, network device 220, and/or client device 210), a request category of a request received from client device 210, a profile of client device 210 (e.g., whether client device 210 appears to be associated with suspicious or legitimate requests, a type of browser being used by client device 210, etc.), a request history associated with client device 210 (e.g., a quantity of requests associated with client device 210, a quantity of repetitive requests associated with client device 210, an indication of whether client device 210 has previously solved a computationally expensive problem, an indication of whether client device 210 has previously been granted or denied access to a resource, etc.), or the like. In some implementations, security device 230 may randomly determine the type of computationally expensive problem to be provided to client device 210 (e.g., by randomly selecting the problem from a list of problems).

In some implementations, a computationally expensive problem may be associated with a difficulty level (e.g., high, medium, low; a value that represents a level of difficulty on a difficulty scale; etc.), and security device 230 may determine a difficulty level for a computationally expensive problem to be provided to client device 210. The difficulty level may be based on, for example, a quantity of memory required to solve the problem, an amount of processing power required to solve the problem (e.g., in a particular time period), or the like. Security device 230 may select the difficulty level based on, for example, a DoS metric, a request category of a request received from client device 210, a profile of client device 210, a request history associated with client device 210, a probability that a particular request is a suspicious and/or malicious request, or the like.

As further shown in FIG. 4, process 400 may include providing the computationally expensive problem to the client device (block 440), and receiving a solution to the computationally expensive problem (block 450). For example, security device 230 may provide, to client device 210, information that identifies a computationally expensive problem. The computationally expensive problem may be provided as code (e.g., a script, such as JavaScript), and the code may cause client device 210 to perform the computationally expensive problem, and/or to generate a solution to the computationally expensive problem. In some implementations, security device 230 may randomize the code and/or obfuscate the code so that the code is difficult for an attacker to detect. In this way, code provided to a first client device 210 may be different than code provided to a second client device 210 (e.g., even if the code represents the same computationally expensive problem). In some implementations, the code may include intentional errors, and the presence of such errors in the solution may be verified by security device 230 when verifying the solution.

Additionally, or alternatively, security device 230 may provide code that causes client device 210 to provide a message for display (e.g., "Please wait while the website is being accessed"), such as via a web browser. Client device 210 may compute a solution to the computationally expensive problem, and may provide the solution to security device 230.

As an example, a computationally expensive problem may include a hash criterion problem. A hash criterion problem may include providing a first string of characters (e.g., a random string) to client device 210, and requesting that client device 210 determine a second string of characters that, when appended to the first string, creates a resulting string that, when hashed using a particular hashing algorithm, generates a hash value that satisfies a particular criterion. For example, the criterion may include a particular quantity of zeros (and/or another character) in the hash value, at the beginning of the hash value (e.g., consecutively), at the end of the hash value (e.g., consecutively), at a particular location in the hash value (e.g., in the middle of the hash value), or the like. As another example, the criterion may require the hash value to include a particular string of characters, a particular quantity of characters, a particular combination of characters (e.g., consecutively or non-consecutively included in the hash value), or the like.

The above hash criterion problem requires that client device 210 repeatedly generate a random string, append the random string to the first string, and determine whether the resulting string satisfies the criterion. When the resulting string satisfies the criterion, client device 210 may provide the second string to security device 230. Security device 230 may then append the second string to the first string, may apply the particular hashing algorithm to the resulting string, and may determine whether the resulting string satisfies the criterion in order to verify the solution. The hashing algorithm may include, for example, the secure hash algorithm (SHA) (e.g., SHA-0, SHA-1, SHA-2, SHA-3, etc.), the advanced encryption standard (AES), the RSA algorithm, the message-digest algorithm (e.g., MD4, MD5, etc.), or the like. Such a problem requires a large amount of computing resources (e.g., processing power) for client device 210 to solve, while requiring a small amount of computing resources for security device 230 to solve, thus limiting the efficacy of a DoS attack.

In some implementations, security device 230 may set a difficulty level for the hash criterion problem by setting the criterion (e.g., requiring a different quantity of characters in the hash value, requiring a string of a particular length, etc.). For example, a lower difficulty level may require that the hash value include four zeros (e.g., null values) at the end of the hash value, while a higher difficulty level may require that the hash value include six zeros at the end of the hash value.

As another example, a computationally expensive problem may include a hash list problem. A hash list problem may include providing a first string of characters (e.g., a seed string) to client device 210. Client device 210 may generate a list of strings (e.g., hash values) based on the first string. For example, client device 210 may apply a hashing algorithm to the first string to generate a second string, may apply the hashing algorithm to the second string to generate a third string, etc., until a large hash list has been created and stored by client device 210 (e.g., a hash list with a quantity of hash values that satisfies a threshold, such as 1,000 hash values). As another example, client device 210 may apply a hashing algorithm to multiple strings in the hash list to generate the next string in the hash list until the large hash list has been created. Additionally, or alternatively, client device 210 may apply a hashing algorithm to one or more strings and one or more random values (e.g., generated using a random number generator; generated using a pseudorandom number generator based on a seed value, such as the first string; etc.) to generate the large hash list.

Once client device 210 has generated the hash list, the computationally expensive problem may require client device 210 to apply a hashing algorithm to different combinations of strings included in the hash list, such that each string in the hash list must be used in some manner to determine a final string. Client device 210 may provide the final string to security device 230, and security device 230 may compare the final string to a solution (e.g., stored in memory) to determine whether the solution to the problem (e.g., the final string) is verified. Such a problem requires a large amount of computing resources (e.g., a large amount of memory space) for client device 210 to solve, while requiring a small amount of computing resources (e.g., memory space) for security device 230 to solve, thus limiting the efficacy of a DoS attack.

As an example, client device 210 may generate a list of hash values from the seed string, where each hash value is the previous hash value appended with the index of the new hash value (e.g., and hashed using a hashing algorithm). Client device 210 may generate a threshold quantity of hash values in the list, such as 1,000 hash values. Client device 210 may then traverse the hash list backwards by hashing the last hash value in the hash list with the preceding hash value in the hash list, and replacing the preceding hash value with the generated hash value. Client device 210 may continue this process until the first hash value in the last has been replaced with a new first hash value, and may provide the new first hash value to security device 230 as the solution. This process requires client device 210 to store all 1,000 values in memory, otherwise client device 210 will be unable to generate the new first hash value.

Although hashing problems are described herein, hashing problems are merely one example of a type of computationally expensive problem. In some implementations, other types of computationally expensive problems may be used.

In some implementations, security device 230 may set a difficulty level for the hash list problem by setting a quantity of strings required to be stored by client device 210 and/or used in the determination of the final string. For example, a lower difficulty level may require that the hash list include 10,000 strings, while a higher difficulty level may require that the hash list include 100,000 strings.

As further shown in FIG. 4, process 400 may include determining whether the solution is verified (block 460). For example, security device 230 may receive the solution from client device 210, and may determine whether the solution is verified. Security device 230 may determine whether the solution is verified by, for example, performing a computation on the solution (e.g., as described herein in connection with the hash criterion problem) and/or by comparing the solution to a value stored in memory (e.g., as described herein in connection with the hash list problem). In some implementations, security device 230 may make a random determination of whether to verify the solution. For example, if security device 230 is undergoing an attack, security device 230 may determine to randomly reject a solution, a particular percentage of solutions, etc.

In some implementations, security device 230 may determine whether a solution is verified based on an amount of time that has passed since the computationally expensive problem was provided to client device 210. For example, if security device 230 receives a solution in too short of a timespan (e.g., an amount of time less than a threshold) for client device 210 to have realistically determined a solution to the problem (e.g., where an attacker uses an external resource other than client device 210 to solve the problem), then security device 230 may determine that the solution is not verified.

As further shown in FIG. 4, if the solution is not verified (block 460-NO), then process 400 may include returning to block 430 to determine another computationally expensive problem to be provided to client device 210. Additionally, or alternatively, security device 230 may prevent access to a resource (e.g., a requested resource, network device 220, etc.) by client device 210 based on determining that the solution is not verified. Security device 230 may continue to prevent client device 210 from accessing the resource until security device 230 receives a correct solution to the computationally expensive problem from client device 210.

In some implementations, security device 230 may provide the same computationally expensive problem to client device 210 based on determining that the solution is not verified. In this case, security device 230 may deny access, by client device 210, to a resource (e.g., network device 220) until security device 230 receives, from client device 210, a correct solution to the problem (e.g., a solution verified by security device 230). In some implementations, security device 230 may provide a different computationally expensive problem to client device 210 based on determining that the solution is not verified (e.g., a different type of problem, a different difficulty level of problem, a different initial value associated with a problem, a different first string associated with a hash list problem, a different random value associated with a hash criterion problem, etc.). For example, when client device 210 fails to provide a correct solution to a computationally expensive problem, security device 230 may provide a more difficult problem to client device 210, such as by adjusting a parameter associated with the problem, requiring more processing power and/or memory space to calculate a solution to the problem, providing multiple problems (e.g., of the same type or of different types), etc.

As further shown in FIG. 4, if the solution is verified (block 460-YES), then process 400 may include providing a response and a verification cookie to the client device (block 470). For example, security device 230 may verify the solution (e.g., may determine that the solution is correct). Security device 230 may grant access to a resource (e.g., network device 220) and/or may provide a response to client device 210 based on verifying the solution. The response may include a response to the request received from client device 210 (e.g., a resource requested by client device 210 and provided by network device 220). In some implementations, security device 230 may provide a verification indicator, such as a verification cookie, in the response. The verification cookie may include a random string generated by security device 230. Security device 230 may use the verification cookie to determine that client device 210 has successfully performed the computationally expensive problem, and to prevent additional problems from being sent to client device 210 based on additional requests received from client device 210. The verification cookie may include embedded and/or encrypted information associated with client device 210 (e.g., an environment of client device 210, a configuration of client device 210, an application running on client device 210, etc.) so that a first client device 210 cannot use a verification cookie intended for a second client device 210. In some implementations, security device 230 may provide the request to network device 220, may receive a response from network device 220, and may insert the verification cookie into the response before providing the response to client device 210.

As further shown in FIG. 4, process 400 may include receiving another request and a verification cookie from the client device (block 480). For example, security device 230 may receive, from client device 210, an additional request. The additional request may include and/or identify a verification cookie. In some implementations, the verification cookie received from client device 210 may be the same as the verification cookie provided to client device 210, in which case security device 230 may respond to the request (e.g., by providing a response from network device 220) without providing a computationally expensive problem to client device 210. In some implementations, the verification cookie received from client device 210 may be different from the verification cookie provided to client device 210, in which case security device 230 may provide a computationally expensive problem in response to the request.

As further shown in FIG. 4, process 400 may include determining whether the verification cookie is valid (block 490). For example, security device 230 may determine whether the verification cookie is valid by comparing the verification cookie, received from client device 210, to the verification cookie provided to client device 210 (e.g., in connection with block 470). As another example, security device 230 may determine whether the verification cookie is valid by determining whether the verification cookie has expired. The verification cookie may expire, for example, after a particular time (e.g., a time threshold), after a particular amount of time has elapsed since security device 230 provided the verification cookie, after a particular quantity of requests have been received that include the verification cookie, etc.

As further shown in FIG. 4, if the verification cookie is valid (block 490-YES), then process 400 may include returning to block 470 to provide a response to the client device. For example, security device 230 may permit client device 210 and network device 220 to communicate normally (e.g., without security device 230 providing a computationally expensive problem to client device 210) until the verification cookie is determined to be invalid. In some implementations, each response provided by security device 230 may include the same verification cookie, or different responses may include different verification cookies (e.g., randomly generated verification cookies), which may then be used to determine whether future requests include a valid verification cookie (e.g., a verification cookie provided in a most recent response).

As further shown in FIG. 4, if the verification cookie is not valid (block 490-NO), then process 400 may include returning to block 430 to determine another computationally expensive problem to be provided to client device 210. Additionally, or alternatively, security device 230 may deny access to a resource (e.g., a requested resource, network device 220, etc.) by client device 210 based on determining that the verification cookie is not valid. Security device 230 may continue to prevent client device 210 from accessing the resource until security device 230 receives, from client device 210, a correct solution to the (potentially different) computationally expensive problem.

In some implementations, security device 230 may determine that the DoS attack has subsided and/or ended (e.g., based on a DoS metric), and may stop providing computationally expensive problems in response to requests from one or more client devices 210. Additionally, or alternatively, security device 230 may adjust a percentage of client devices 210 that receive a computationally expensive problem, may adjust a difficulty level of provided computationally expensive problems, etc. based on determining that the DoS attack has subsided and/or ended, as described elsewhere herein. In this way, security device 230 may limit the efficacy of DoS attacks by increasing the resource demands on client devices 210 requesting resources from network device 220.

Although FIG. 4 shows example blocks of process 400, in some implementations, process 400 may include additional blocks, fewer blocks, different blocks, or differently arranged blocks than those shown in FIG. 4.

FIGS. 5A-5E are diagrams of an example implementation 500 relating to example process 400 shown in FIG. 4. FIGS. 5A-5E show an example of detecting a DDoS attack, providing a first computationally expensive problem to client device 210, receiving a solution to the first problem, determining that a time period has expired and that the DDoS attack is still ongoing, and providing a second computationally expensive problem to client device 210.

Figure 5A:
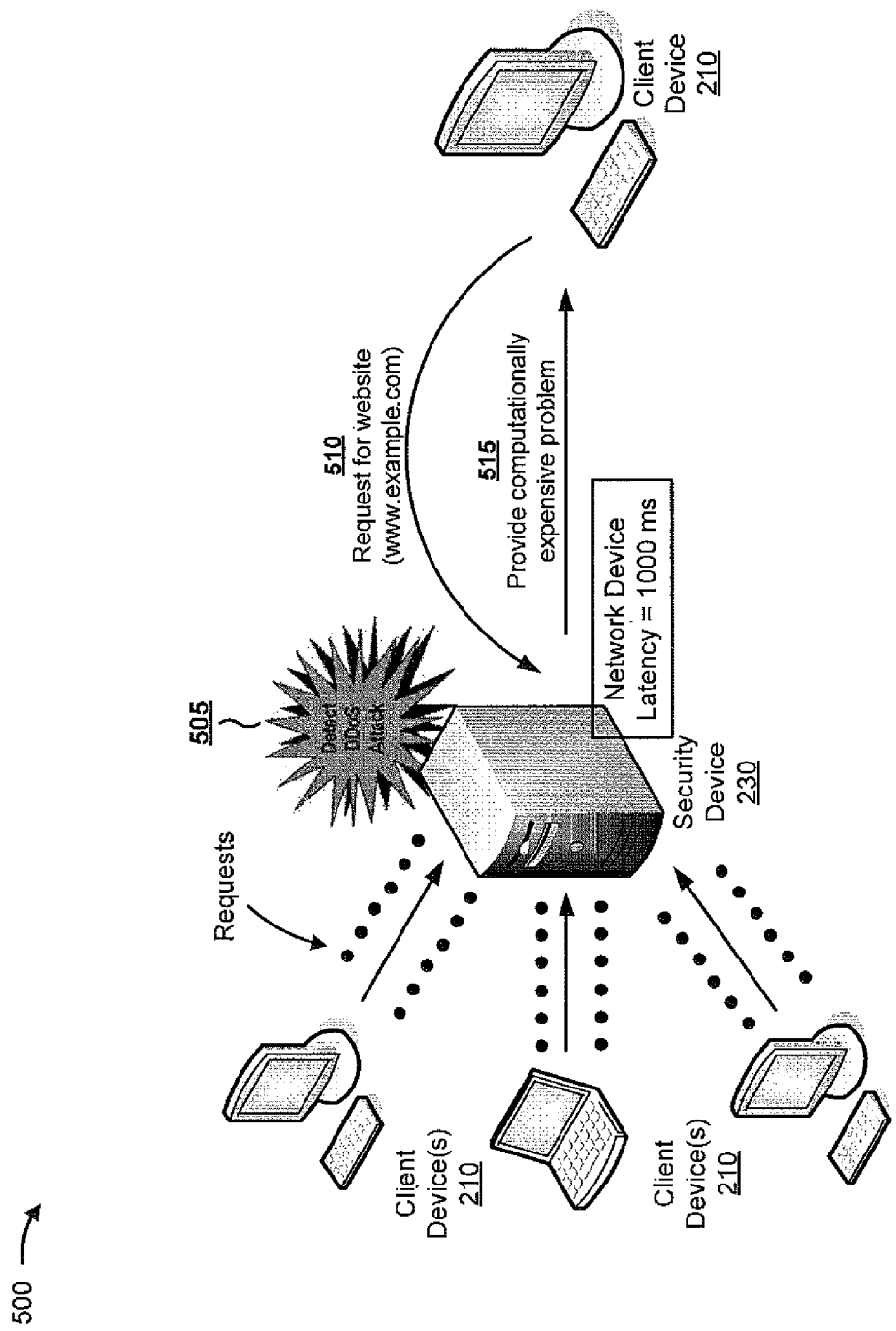
FIGS. 5A-5E are diagrams of an example implementation relating to the example process shown in FIG. 4.

As shown in FIG. 5A, assume that security device 230, acting as an intermediary between client devices 210 and network device 220, is inundated with requests from client devices 210 performing a DDoS attack on network device 220. As shown by reference number 505, security device 230 may detect the DDoS attack by, for example, determining that a quantity of requests received within a particular period of time exceeds a threshold, and/or by determining that a latency for network device 220 to respond to requests exceeds a threshold. As shown, assume that the average latency for network device 220 to respond to requests is 1000 milliseconds (ms). As shown by reference number 510, assume that after detecting the DDoS attack, security device 230 receives a request for a website, shown as www.example.com, from client device 210. As shown by reference number 515, security device 230 provides a computationally expensive problem to client device 210 to mitigate the DDoS attack. Security device 230 may determine a problem to send to client device 210 based on the average latency of 1000 milliseconds. Assume that security device 230 determines that a hash criterion problem (described above in connection with FIG. 4) is to be provided to client device 210, and that security device 230 provides the hash criterion problem as a script to be executed by client device 210.

Figure 5B:
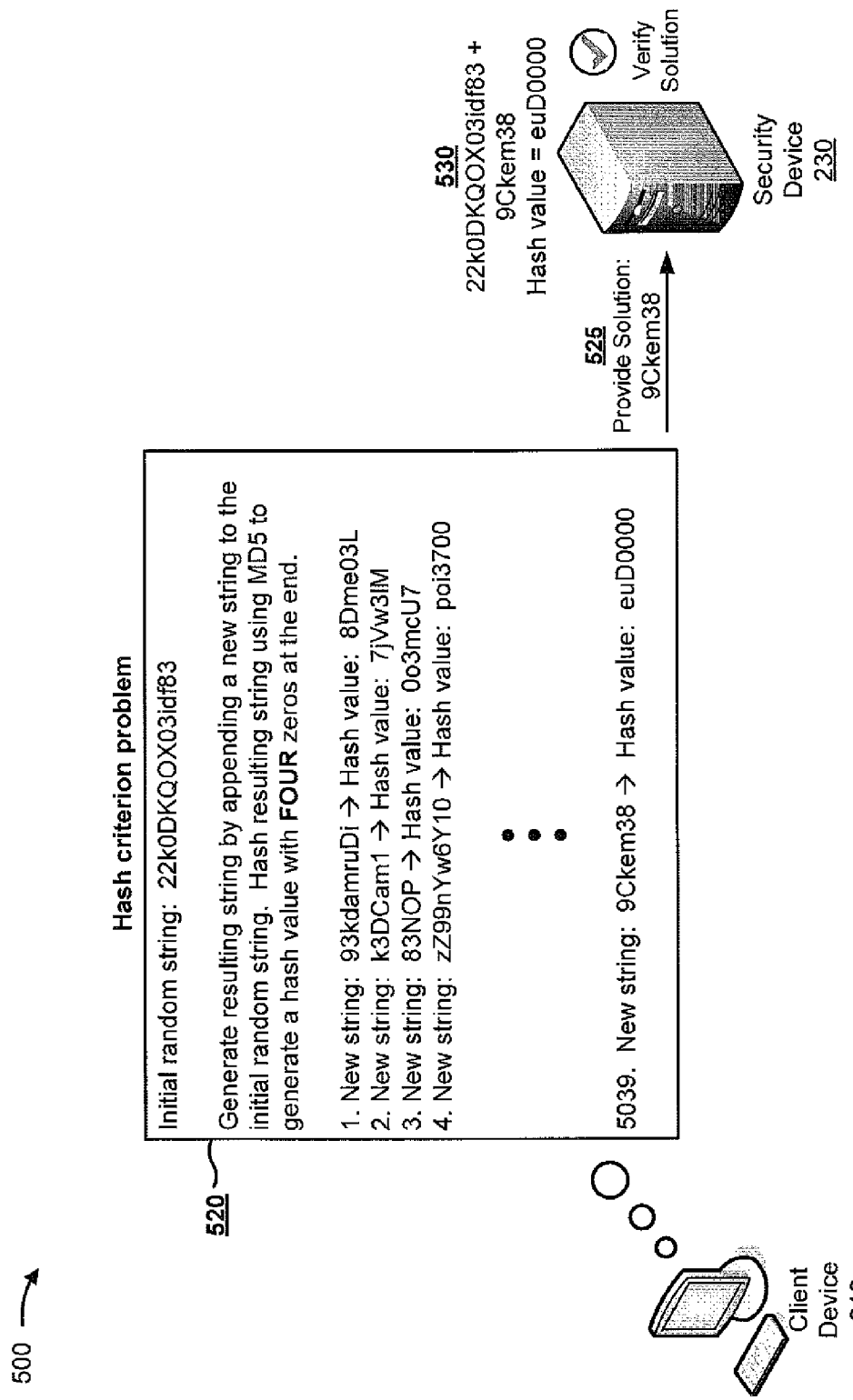

As shown in FIG. 5B, and by reference number 520, client device 210 executes the script to solve the hash criterion problem. For example, assume that security device 230 provides an initial random string (e.g., 22k0DKQOX03idf83) to client device 210. Further assume that security device 230 instructs client device 210 to generate a resulting string by appending a new string to the initial random string and applying a hash algorithm (e.g., MD5) to the resulting string to generate a hash value. Client device 210 is to continue appending new strings to the initial random string until the hash value has four zeros (e.g., null bytes) at the end of the hash value. As shown, assume that on the 5,039th iteration, client device 210 determines a new string (e.g., 9Ckem38) that, when the new string is appended to the initial random string and the resulting string is hashed using the MD5 algorithm, generates a hash value with four trailing zeros (e.g., euD0000). This hash criterion problem requires client device 210 to consume a large amount of processing power, thus slowing client device 210 and limiting the efficacy of the DDoS attack.

As shown by reference number 525, client device 210 may provide the solution string (e.g., 9Ckem38, the new string that results in the hash value with four trailing zeros) to security device 230. As shown by reference number 530, security device 230 may verify the solution by appending the solution string to the initial random string to generate a resulting string, hashing the resulting string using the MD5 algorithm, and verifying that the resulting hash value contains four trailing zeros. As shown in FIG. 5B, assume that security device 230 has verified the solution. If security device 230 does not verify the solution (e.g., if the solution string does not result in a hash value with at least four trailing zeros), then security device 230 may prevent client device 210 from accessing the website www.example.com (e.g., may drop all traffic received from client device 210), may provide the same problem to client device 210, may provide a different (e.g., more difficult) problem to client device 210, or the like.

Figure 5C:
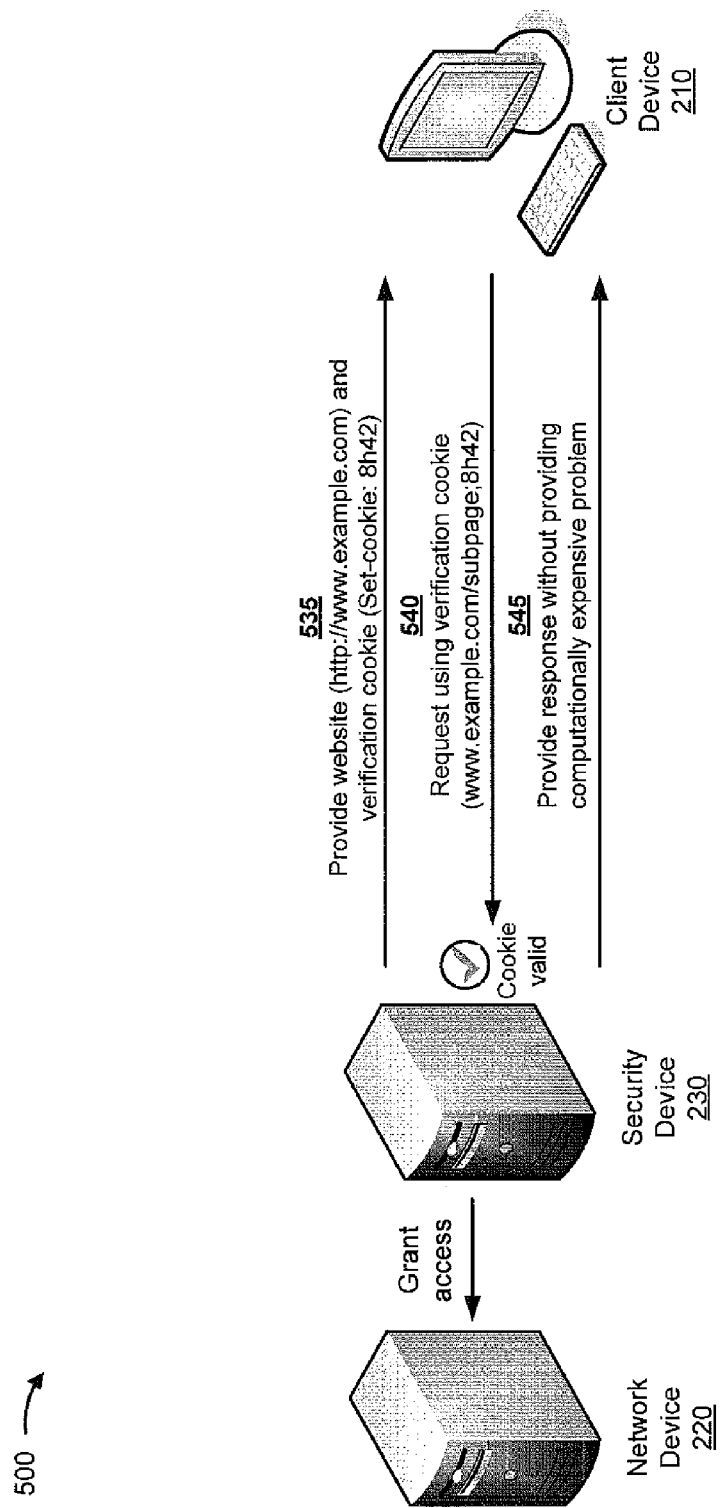

As shown in FIG. 5C, assume that security device 230 has verified the solution provided by client device 210, and has granted client device 210 access to network device 220 (e.g., the website hosted by network device 220). As shown by reference number 535, security device 230 provides the website (e.g., received from network device 220), www.example.com, to client device 210. As further shown, security device 230 also provides a verification cookie (e.g., 8h42) to client device 210. As shown by reference number 540, assume that client device 210 sends an additional request to security device 230, and that the additional request includes the verification cookie. For example, assume that client device 210 requests a subpage of the website, and includes the verification cookie in the request, by sending a request for www.example.com/subpage; 8h42, as shown. Assume that security device 230 determines that the verification cookie is valid, and provides a response to the request (e.g., receives the subpage from network device 220 and provides the subpage to client device 210) without requiring client device 210 to perform another computationally expensive problem, as shown by reference number 545.

Figure 5D:
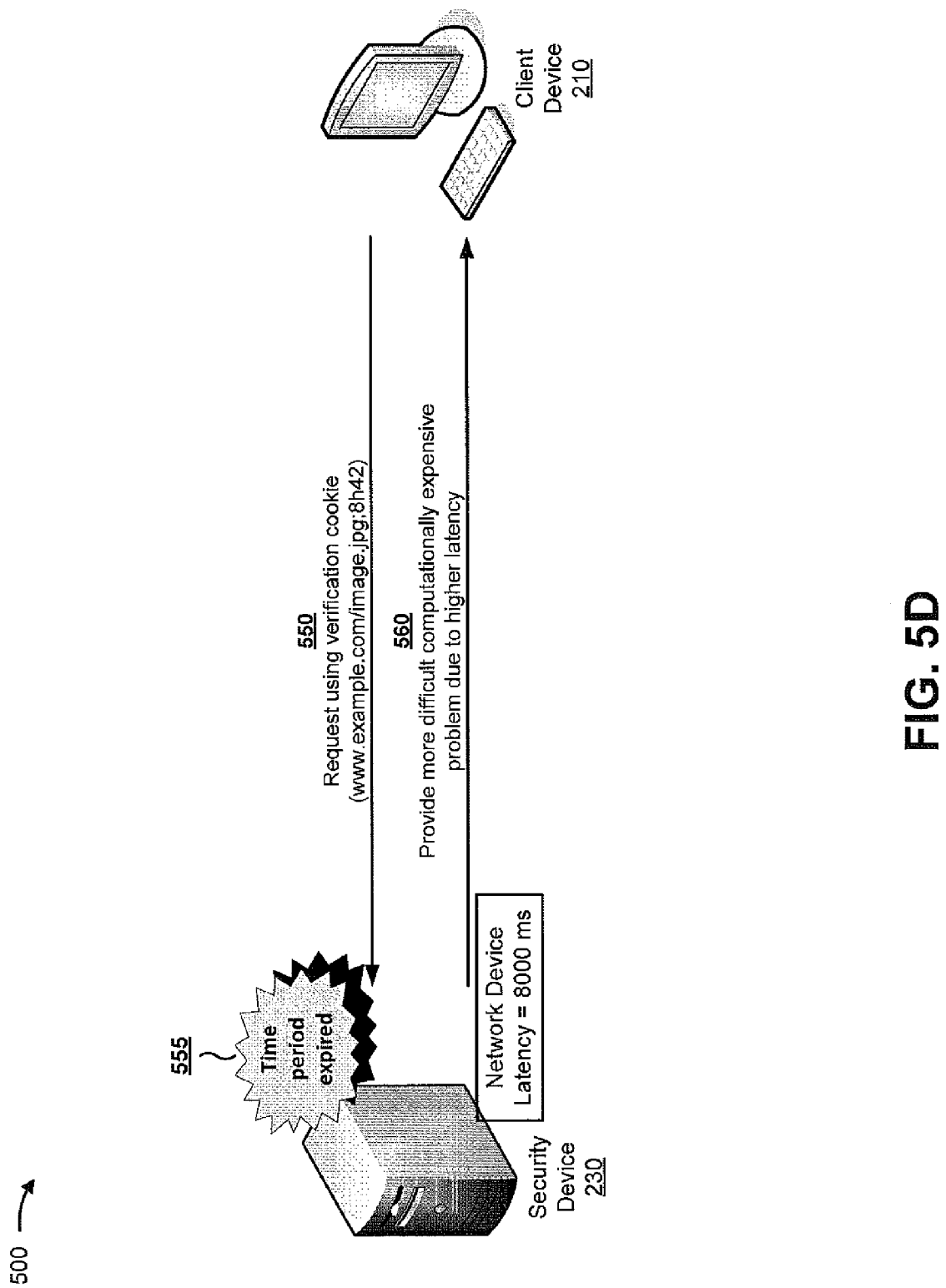

As shown in FIG. 5D, assume that at a later time, client device 210 sends an additional request to network device 220, which is intercepted by security device 230. For example, as shown by reference number 550, assume that client device 210 requests a resource (e.g., an image) from the website, and includes the verification cookie in the request, by sending a request for www.example.com/image.jpg; 8h42, as shown. As shown by reference number 555, assume that security device 230 determines that a time period associated with the verification cookie has expired. Further assume that security device 230 detects that the DDoS attack is ongoing by, for example, determining that a quantity of requests received within a particular period of time exceeds a threshold, and/or by determining that a latency for network device 220 to respond to requests exceeds a threshold. As shown, assume that the average latency for network device 220 to respond to requests is 8000 milliseconds. Assume that security device 230 determines, based on the average latency of 8000 milliseconds, that a hash criterion problem and a hash list problem (described above in connection with FIG. 4) are both to be provided to client device 210. As shown by reference number 560, assume that security device 230 provides the hash criterion problem and the hash list problem as a script to be executed by client device 210. Security device 230 may provide both problems and/or more difficult problems than described in FIGS. 5A and 5B because the latency of responding to requests has increased from 1000 milliseconds to 8000 milliseconds.

Figure 5E:
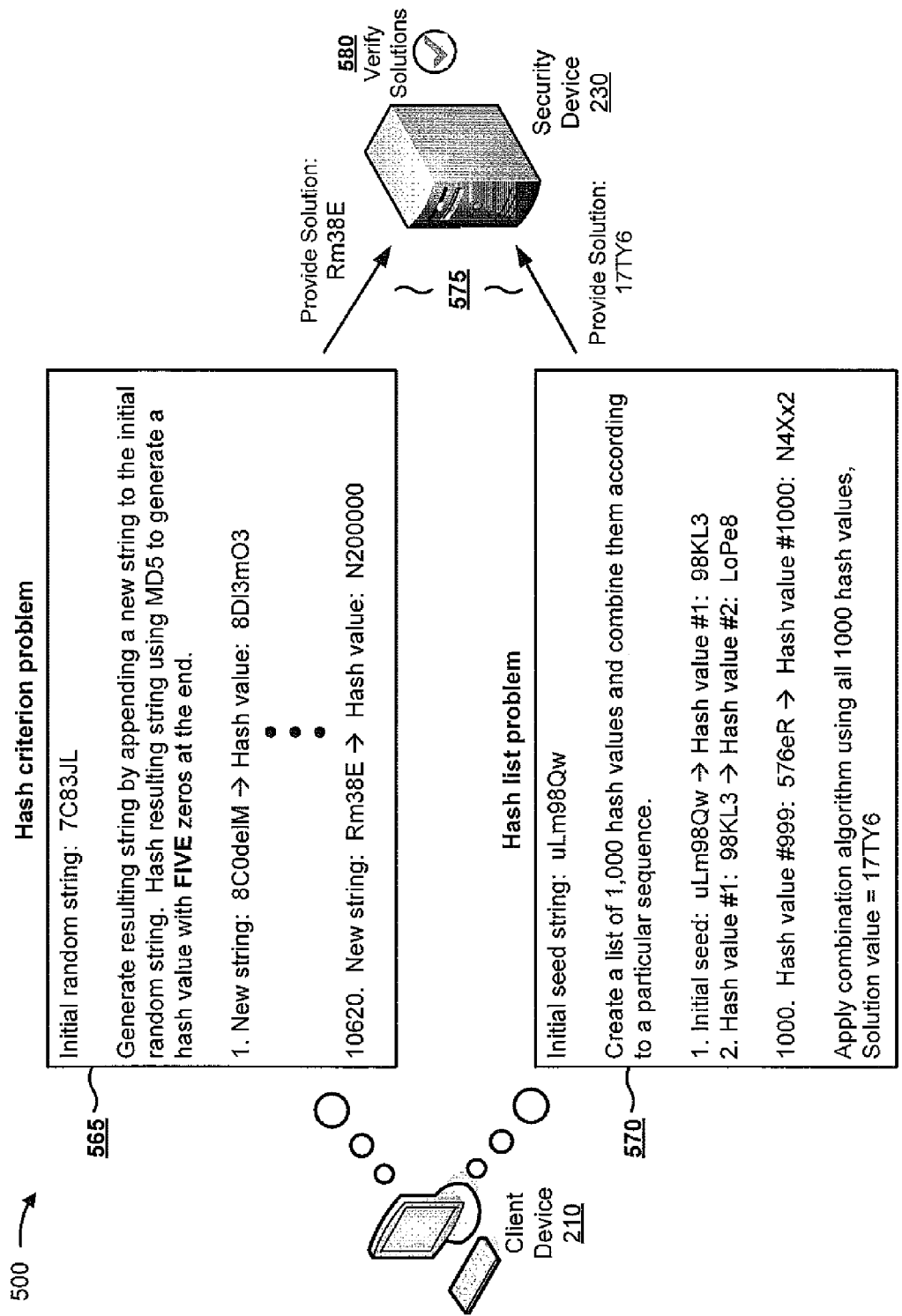

As shown in FIG. 5E, and by reference number 565, client device 210 executes a script to solve the hash criterion problem. For example, assume that security device 230 provides an initial random string (e.g., 7C83JL) to client device 210. Further assume that security device 230 instructs client device 210 to generate a resulting string by appending a new string to the initial random string and applying a hash algorithm (e.g., MD5) to the resulting string to generate a hash value. Client device 210 is to continue appending new strings to the initial random string until the hash value has five zeros (e.g., null bytes) at the end of the hash value. Assume that security device 230 provides instructions requiring a hash value with five zeros instead of four zeros (e.g., as per the problem described in connection with FIG. 5B) because the DDoS attack has increased in intensity, as evidenced by the higher latency value shown in FIG. 5D as compared to FIG. 5A. As shown, assume that on the 10,620th iteration, client device 210 determines a new string (e.g., Rm38E) that, when the new string is appended to the initial random string and the resulting string is hashed using the MD5 algorithm, generates a hash value with five trailing zeros (e.g., N200000). This hash criterion problem requires client device 210 to consume a large amount of processing power, thus slowing client device 210 and limiting the efficacy of the DDoS attack.

As shown by reference number 570, client device 210 also executes a script to solve the hash list problem. For example, assume that security device 230 provides an initial seed string (e.g., uLm98Qw) to client device 210. Further assume that security device 230 instructs client device 210 to generate a solution value by generating a list of 1,000 hash values from the initial seed string and by combining the hash values in the list according to a specified algorithm and/or sequence. As shown, client device 210 generates the 1,000 hash values and combines them according to the algorithm to generate a solution value (e.g., 17TY6). This hash list problem requires client device 210 to consume a large amount of memory space, thus slowing client device 210 and limiting the efficacy of the DDoS attack.

As shown by reference number 575, client device 210 provides the solution to the hash criterion problem (e.g., Rm38E) and the solution to the hash list problem (e.g., 17TY6) to security device 230. As shown by reference number 580, assume that security device 230 verifies the solutions. For example, security device 230 may verify the solution to the hash criterion problem as described herein in connection with FIG. 5B. Security device 230 may verify the solution to the hash list problem by comparing the received solution to a value stored in memory (e.g., a solution value associated with the initial seed string provided to client device 210). Because security device 230 has verified the solutions, security device 230 may grant access to network device 220, and network device 220 may respond to requests from client device 210. Security device 230 may continue to operate in this manner or a similar manner until the DDoS attack has subsided.

As indicated above, FIGS. 5A-5E are provided merely as an example. Other examples are possible and may differ from what was described with regard to FIGS. 5A-5E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors, at least partially implemented in hardware, to:
detect a denial-of-service attack;
receive a request, for access to a resource, from a client device;
determine, based on the request and further based on detecting the denial-of-service attack, a computationally expensive problem to be provided to the client device,
the computationally expensive problem being determined based on:
a type of browser being utilized by the client device, and
a request category associated with the request;
provide the computationally expensive problem to the client device,
the computationally expensive problem being provided to cause the client device to solve the computationally expensive problem,
the computationally expensive problem causing the client device to utilize an amount of processing power and memory space to solve the computationally expensive problem,
the amount of processing power and memory space satisfying a threshold, and being utilized by the client device prior to the client device from sending one or more additional requests;
receive, from the client device, a solution to the computationally expensive problem; and
grant or deny the client device access to the resource based on the solution to the computationally expensive problem.

2. The device of claim 1, where the one or more processors are further to:
process the solution by at least one of:
comparing the solution to a stored value; or
performing a calculation using the solution; and
where the one or more processors, when granting or denying access to the resource, are to:
grant or deny access to the resource based on processing the solution.

3. The device of claim 1, where the one or more processors, when determining the computationally expensive problem to be provided to the client device, are to:
determine a metric associated with the denial-of-service attack; and
determine the computationally expensive problem based on the metric.

4. The device of claim 1, where the one or more processors, when granting or denying access to the resource, are to:
grant access to the resource; and
where the one or more processors are further to:
provide a verification indicator to the client device based on granting access to the resource;
receive an additional request from the client device, the additional request including the verification indicator;
verify the verification indicator; and
provide a response to the additional request based on verifying the verification indicator,
the response not including the computationally expensive problem or another computationally expensive problem.

5. The device of claim 1, where the one or more processors, when granting or denying access to the resource, are to:
deny access to the resource; and
where the one or more processors are further to:
provide an additional computationally expensive problem to the client device based on denying access to the resource,
the additional computationally expensive problem requiring more processing power or memory space to solve than the computationally expensive problem.

6. The device of claim 1, where the one or more processors, when granting or denying access to the resource, are to:
grant access to the resource; and
where the one or more processors are further to:
provide a verification indicator to the client device based on granting access to the resource;
receive an additional request from the client device, the additional request including the verification indicator;
determine that the verification indicator has expired; and
provide an additional computationally expensive problem to the client device based on determining that the verification indicator has expired.

7. The device of claim 1, where the one or more processors, when determining the computationally expensive problem to be provided to the client device, are to:
determine a profile associated with the client device,
the profile indicating a probability that the request is associated with the denial-of-service attack, and
the profile indicating the type of browser being utilized by the client device; and
determine the computationally expensive problem based on the profile.

8. A non-transitory computer-readable storage medium storing instructions, the instructions comprising:
one or more instructions that, when executed by one or more processors, cause the one or more processors to:
detect an attack;
receive, from a client device, a request for a resource;
determine, based on detecting the attack, a computationally expensive problem to be provided to the client device,
the computationally expensive problem being determined based on:
a type of browser being utilized by the client device, and
a request category associated with the request,
the computationally expensive problem requiring a computation by the client device to solve the computationally expensive problem,
the computationally expensive problem causing the client device to utilize an amount of processing power and memory space to solve the computationally expensive problem,
the amount of processing power and memory space satisfying a threshold and being utilized by the client device prior to the client device sending one or more additional requests;
instruct the client device to provide a solution to the computationally expensive problem;
receive, from the client device, the solution to the computationally expensive problem; and selectively provide the client device with access to the resource based on the solution to the computationally expensive problem.

9. The non-transitory computer-readable storage medium of claim 8, where the one or more instructions, when executed by the one or more processors,
further cause the one or more processors to:
process the solution by at least one of:
comparing the solution to a stored value; or
performing a calculation using the solution; and
where the one or more instructions, that cause the one or more processors to selectively provide access to the resource, cause the one or more processors to:
selectively provide access to the resource based on processing the solution.

10. The non-transitory computer-readable storage medium of claim 8, where the one or more instructions, that cause the one or more processors to determine the computationally expensive problem to be provided to the client device, cause the one or more processors to:
determine a metric associated with the attack; and
determine the computationally expensive problem based on the metric.

11. The non-transitory computer-readable storage medium of claim 8, where the one or more instructions, that cause the one or more processors to selectively provide access to the resource, cause the one or more processors to:
provide access to the resource; and
where the one or more instructions further cause the one or more processors to:
provide a verification indicator to the client device based on providing access to the resource;
receive an additional request from the client device, the additional request including the verification indicator;
verify the verification indicator; and
provide a response to the additional request based on verifying the verification indicator,
the response not including the computationally expensive problem or another computationally expensive problem.

12. The non-transitory computer-readable storage medium of claim 8, where the one or more instructions, that cause the one or more processors to selectively provide access to the resource, cause the one or more processors to:
deny access to the resource; and
where the one or more instructions further cause the one or more processors to:
provide an additional computationally expensive problem to the client device based on denying access to the resource,
the additional computationally expensive problem requiring more computing resources to solve than the computationally expensive problem.

13. The non-transitory computer-readable storage medium of claim 8, where the one or more instructions, that cause the one or more processors to selectively provide access to the resource, cause the one or more processors to:
provide access to the resource; and
where the one or more instructions further cause the one or more processors to:
provide a verification indicator to the client device based on providing access to the resource;
receive an additional request from the client device, the additional request including the verification indicator;
determine that the verification indicator is invalid; and
provide an additional computationally expensive problem to the client device based on determining that the verification indicator is invalid.

14. The non-transitory computer-readable storage medium of claim 8, where the one or more instructions, that cause the one or more processors to determine the computationally expensive problem to be provided to the client device, cause the one or more processors to:
determine a profile associated with the client device,
the profile indicating a probability that the request is associated with the attack, and
the profile indicating the type of browser being utilized by the client device; and
determine the computationally expensive problem based on the profile.

15. A method, comprising:
detecting, by a security device, a denial-of-service attack;
receiving, by the security device and from a client device, a request;
determining, by the security device and based on detecting the denial-of-service attack, a computationally expensive problem to be provided to the client device,
the computationally expensive problem being determined based on:
a type of browser being utilized by the client device, and
a request category associated with the request,
the computationally expensive problem causing the client device to utilize an amount of processing power and memory space to solve the computationally expensive problem,
the amount of processing power and memory space satisfying a threshold and being utilized by the client device prior to the client device sending one or more additional requests;
determining, by the security device, code that causes the client device to solve the computationally expensive problem;
instructing, by the security device, the client device to execute the code,
the code causing the client device to generate a solution to the computationally expensive problem;
receiving, by the security device and from the client device, the solution; and
providing, by the security device and to the client device, a response to the request based on the solution.

16. The method of claim 15, further comprising:
determining that the solution is correct; and
where providing the response comprises:
providing the response, to the request, that does not include the computationally expensive problem, based on determining that the solution is correct.

17. The method of claim 15, further comprising:
determining that the solution is incorrect; and
where providing the response comprises:
providing the response, to the request, that includes another computationally expensive problem, based on determining that the solution is incorrect.

18. The method of claim 15, where determining the computationally expensive problem comprises:
determining a metric associated with the denial-of-service attack; and
determining the computationally expensive problem based on the metric.

19. The method of claim 15, further comprising:
determining that the solution is incorrect;

denying access to a resource requested in the request based on determining that the solution is incorrect; and
where providing the response comprises:
provproviding an additional computationally expensive problem to the client device based on denying access to the resource,
the additional computationally expensive problem requiring more computing resources to solve than the computationally expensive problem.

20. The method of claim 15, further comprising:
determining that the solution is correct;
granting access to a resource requested in the request based on determining that the solution is correct;
where providing the response comprises:
providing a verification indicator to the client device based on determining that the solution is correct; and
where the method further comprises:
receiving an additional request from the client device, the additional request including the verification indicator;
determining that the verification indicator is invalid;
determining a metric associated with the denial-of-service attack; and
providing an additional computationally expensive problem to the client device based on determining that the verification indicator is invalid and further based on the metric.

* * * * *